(12) United States Patent
Terry et al.

(10) Patent No.: US 8,179,836 B2
(45) Date of Patent: May 15, 2012

(54) METHOD AND APPARATUS FOR CONTROLLING TRANSMISSIONS VIA AN ENHANCED DEDICATED CHANNEL

(75) Inventors: Stephen E. Terry, Northport, NY (US); Guodong Zhang, Farmingdale, NY (US); Jung-Lin Pan, Selden, NY (US); Peter Shaomin Wang, E. Setauket, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 860 days.

(21) Appl. No.: 11/405,911

(22) Filed: Apr. 18, 2006

(65) Prior Publication Data

US 2006/0268884 A1 Nov. 30, 2006

Related U.S. Application Data

(60) Provisional application No. 60/673,076, filed on Apr. 20, 2005.

(51) Int. Cl.
*H04W 4/00* (2009.01)

(52) U.S. Cl. ........... 370/328; 370/252; 370/310.2; 370/318; 370/349; 455/127.1; 455/127.2; 455/136; 455/138; 455/232.1; 455/355; 455/422.1; 455/522

(58) Field of Classification Search .......... 370/232, 370/252, 318–321, 342–345, 347, 412, 441–442, 370/395.4, 310.2, 328–339, 349; 455/127.1, 455/127.2, 136, 138, 232.1, 239.1, 245.1, 455/250.1, 355, 422.1, 522
See application file for complete search history.

(56) References Cited

U.S. PATENT DOCUMENTS

| | | | |
|---|---|---|---|
| 6,654,358 B1 | 11/2003 | Park et al. | |
| 6,845,088 B2 | 1/2005 | Terry et al. | |
| 7,010,317 B2 | 3/2006 | Hwang et al. | |
| 7,161,971 B2 | 1/2007 | Tiedemann, Jr. et al. | |
| 7,382,747 B2 * | 6/2008 | Hu et al. | 370/329 |
| 7,397,790 B2 | 7/2008 | Zeira et al. | |
| 7,408,895 B2 | 8/2008 | Zhang et al. | |
| 7,509,554 B2 * | 3/2009 | Lohr et al. | 714/748 |
| 2003/0112786 A1 * | 6/2003 | Terry et al. | 370/342 |
| 2003/0232622 A1 | 12/2003 | Seo et al. | |
| 2004/0100921 A1 | 5/2004 | Khan | |
| 2004/0185892 A1 | 9/2004 | Iacono et al. | |

(Continued)

OTHER PUBLICATIONS

3GPP, 3GPP TR 25.896 v6.0.0, Mar. 2004, 3GPP.*

(Continued)

*Primary Examiner* — Aung S Moe
*Assistant Examiner* — Hoon J Chung
(74) *Attorney, Agent, or Firm* — Volpe and Koenig, P.C.

(57) ABSTRACT

A method and apparatus for controlling transmissions of data via an enhanced dedicated channel (E-DCH) are disclosed. A list of available transport format combinations (TFCs) is generated based on a plurality of dedicated channel medium access control (MAC-d) flows. An enhanced uplink medium access control (MAC-e) protocol data unit (PDU) is generated using a TFC which is selected from the list of available TFCs. The MAC-e PDU is forwarded to a hybrid-automatic repeat request (H-ARQ) process unit for transmission. The list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC.

24 Claims, 6 Drawing Sheets

U.S. PATENT DOCUMENTS

| | | | |
|---|---|---|---|
| 2004/0219917 A1 | 11/2004 | Love et al. | |
| 2004/0219919 A1 | 11/2004 | Whinnett et al. | |
| 2004/0219920 A1 | 11/2004 | Love et al. | |
| 2005/0025100 A1 | 2/2005 | Lee et al. | |
| 2005/0030953 A1 | 2/2005 | Vasudevan et al. | |
| 2005/0043062 A1 | 2/2005 | Ahn et al. | |
| 2005/0047416 A1* | 3/2005 | Heo et al. | 370/395.4 |
| 2005/0073985 A1 | 4/2005 | Heo et al. | |
| 2005/0076173 A1 | 4/2005 | Merril et al. | |
| 2005/0079865 A1 | 4/2005 | Ahn et al. | |
| 2005/0117559 A1 | 6/2005 | Malladi et al. | |
| 2005/0124372 A1* | 6/2005 | Lundby et al. | 455/522 |
| 2005/0249138 A1 | 11/2005 | Heo et al. | |
| 2005/0249148 A1 | 11/2005 | Nakamata et al. | |
| 2005/0265301 A1 | 12/2005 | Heo et al. | |
| 2006/0003787 A1 | 1/2006 | Heo et al. | |
| 2006/0111119 A1 | 5/2006 | Iochi | |
| 2006/0120404 A1* | 6/2006 | Sebire et al. | 370/469 |
| 2006/0143444 A1* | 6/2006 | Malkamaki et al. | 713/160 |
| 2006/0187844 A1* | 8/2006 | Chun et al. | 370/242 |
| 2007/0121542 A1 | 5/2007 | Lohr et al. | |
| 2007/0168827 A1* | 7/2007 | Lohr et al. | 714/749 |
| 2009/0034455 A1* | 2/2009 | Lee et al. | 370/329 |

OTHER PUBLICATIONS

Third Generation Partnership Project, "Technical Specification Group Radio Access Network; Feasibility Study for Enhanced Uplink for Utra Fdd (Release 6)," 3GPP Tr 25.896 V6.0.0 (Mar. 2004). 1 Corresponds to Tw 200402976; 2 Corresponds to Tw 200404435; 3 Corresponds to Kr 20000008081 and Kr 334,818; 4 Corresponds to Kr 20080016946.

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

Third Generation Partnership Project, "Technical Specification Group Radio Access Network; Feasibility Study for Enhanced Uplink for UTRA FDD; (Release 6)," 3GPP TR 25.896 V1.0.0 (Sep. 2003).

* cited by examiner

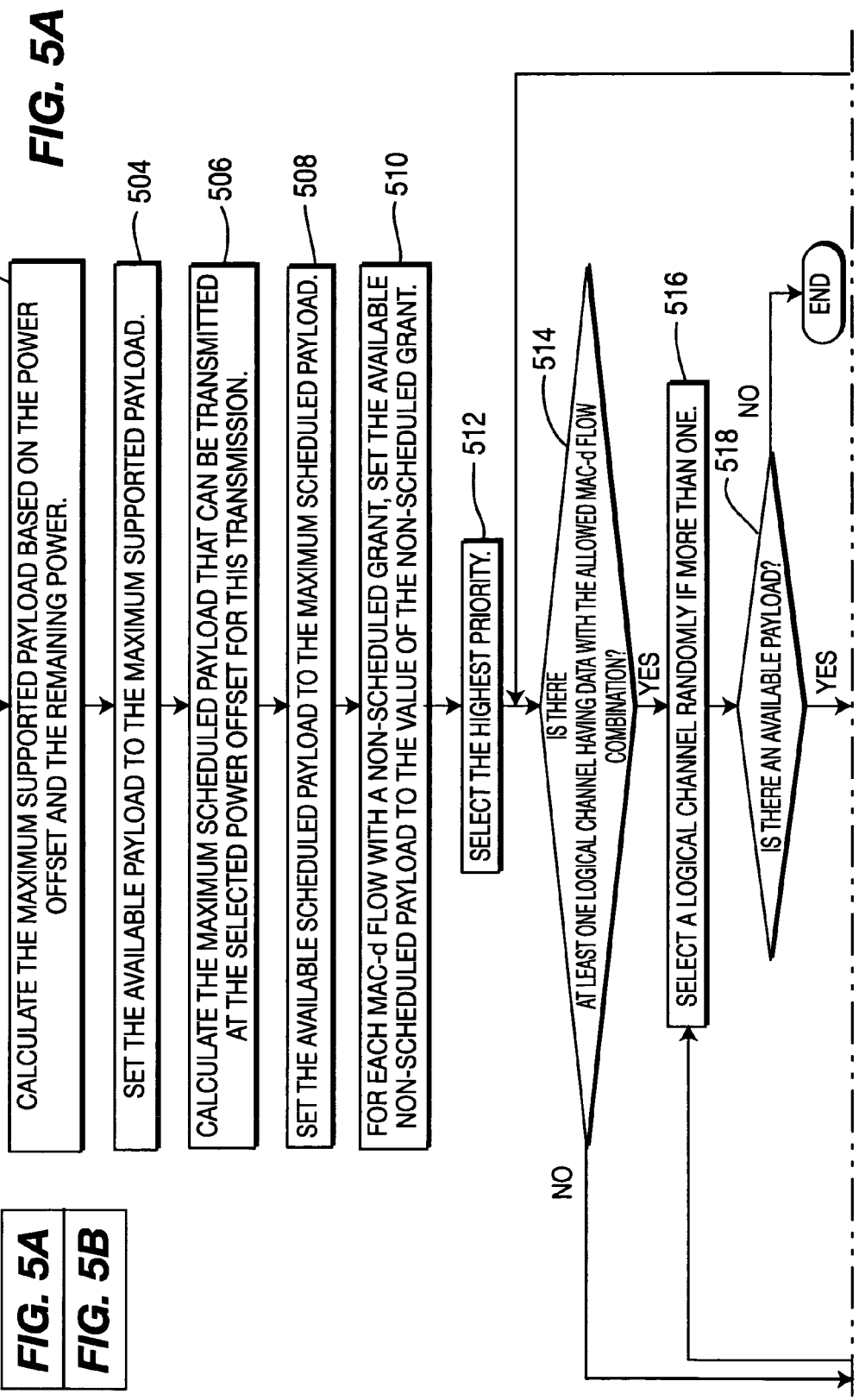

METHOD AND APPARATUS FOR CONTROLLING TRANSMISSIONS VIA AN ENHANCED DEDICATED CHANNEL

CROSS REFERENCE TO RELATED APPLICATION

This application claims the benefit of U.S. Provisional Application No. 60/673,076 filed Apr. 20, 2005, which is incorporated by reference as if fully set forth.

FIELD OF INVENTION

The present invention relates to wireless communication systems. More particularly, the present invention is related to a method and apparatus for controlling transmissions via an enhanced dedicated channel (E-DCH).

BACKGROUND

Methods for improving uplink (UL) coverage, throughput, and transmission latency are currently being investigated in the third generation partnership project (3GPP). In order to achieve these goals, enhanced uplink (EU) transmissions have been proposed in 3GPP, in which control, (i.e., scheduling and assigning), of UL resources, (i.e., physical channels), is moved from a radio network controller (RNC) to a Node-B.

FIG. 1 shows a conventional wireless transmit/receive unit (WTRU), (e.g., mobile station), side medium access control (MAC) architecture 100. The WTRU MAC architecture 100 includes an enhanced uplink medium access control (MAC-es/MAC-e) entity 105, which comprises different independent sub-layer entities within the MAC. The MAC-es/-e functionality split is a result of how the MAC functionality is partitioned within the universal terrestrial radio access network (UTRAN). The WTRU MAC architecture 100 further includes a high speed MAC entity 110, a common/shared MAC (MAC-c/sh) 115, a dedicated channel medium access control (MAC-d) 120 and a MAC service access point (SAP) 125. The MAC-c/sh 115 controls access to all common transport channels, except the HS-DSCH transport channel 145. The MAC-d 120 controls access to all dedicated transport channels, to the MAC-c/sh 115 and the MAC-hs 110. The MAC-hs 110 controls access to the HS-DSCH transport channel 145.

The MAC-es/MAC-e entity 105 controls access to an E-DCH 130, whereby the MAC-d 120 may access the E-DCH 130 via a connection 135, and the MAC control SAP 125 may access the E-DCH 130 via a connection 140.

FIG. 2 shows MAC interworking in the conventional WTRU of FIG. 1. As shown in FIG. 2, a radio link control (RLC) protocol data unit (PDU) enters the MAC-d on a logical channel. In the MAC-e header, a data description indicator (DDI) field, (6 bits), identifies the logical channel, MAC-d flow and MAC-d PDU size. A mapping table is signaled over radio resource control (RRC) signaling to allow the WTRU to set the DDI values. The N field, (fixed size of 6 bits), indicates the number of consecutive MAC-d PDUs corresponding to the same DDI value. A special value of the DDI field indicates that no more data is contained in the remaining part of the MAC-e PDU. The transmission sequence number (TSN) field (6 bits) provides the transmission sequence number on the E-DCH 130 shown in FIG. 1. The MAC-e PDU is forwarded to a hybrid-automatic repeat request (H-ARQ) entity, which then forwards the MAC-e PDU to layer 1 for transmission in one transmission time interval (TTI).

An efficient MAC architecture for controlling the transmission of E-DCH data is desired.

SUMMARY

The present invention is related to a method and apparatus for controlling transmissions via an E-DCH. A list of available transport format combinations (TFCs) is generated based on a plurality of MAC-d flows. A MAC-e PDU is generated using a TFC which is selected from the list of available TFCs. The MAC-e PDU is forwarded to an H-ARQ process unit for transmission. The list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC.

BRIEF DESCRIPTION OF THE DRAWINGS

A more detailed understanding of the invention may be had from the following description of a preferred example, given by way of example and to be understood in conjunction with the accompanying drawing wherein:

FIGS. 5A and 5B, taken together, depict a flow diagram of a process for multiplexing MAC-d flows into a MAC-e PDU in accordance with the present invention.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

Hereinafter, the terminology "MAC-e" will be used to reference both MAC-e and MAC-es collectively.

The features of the present invention may be incorporated into an integrated circuit (IC) or be configured in a circuit comprising a multitude of interconnecting components.

Figure 1:
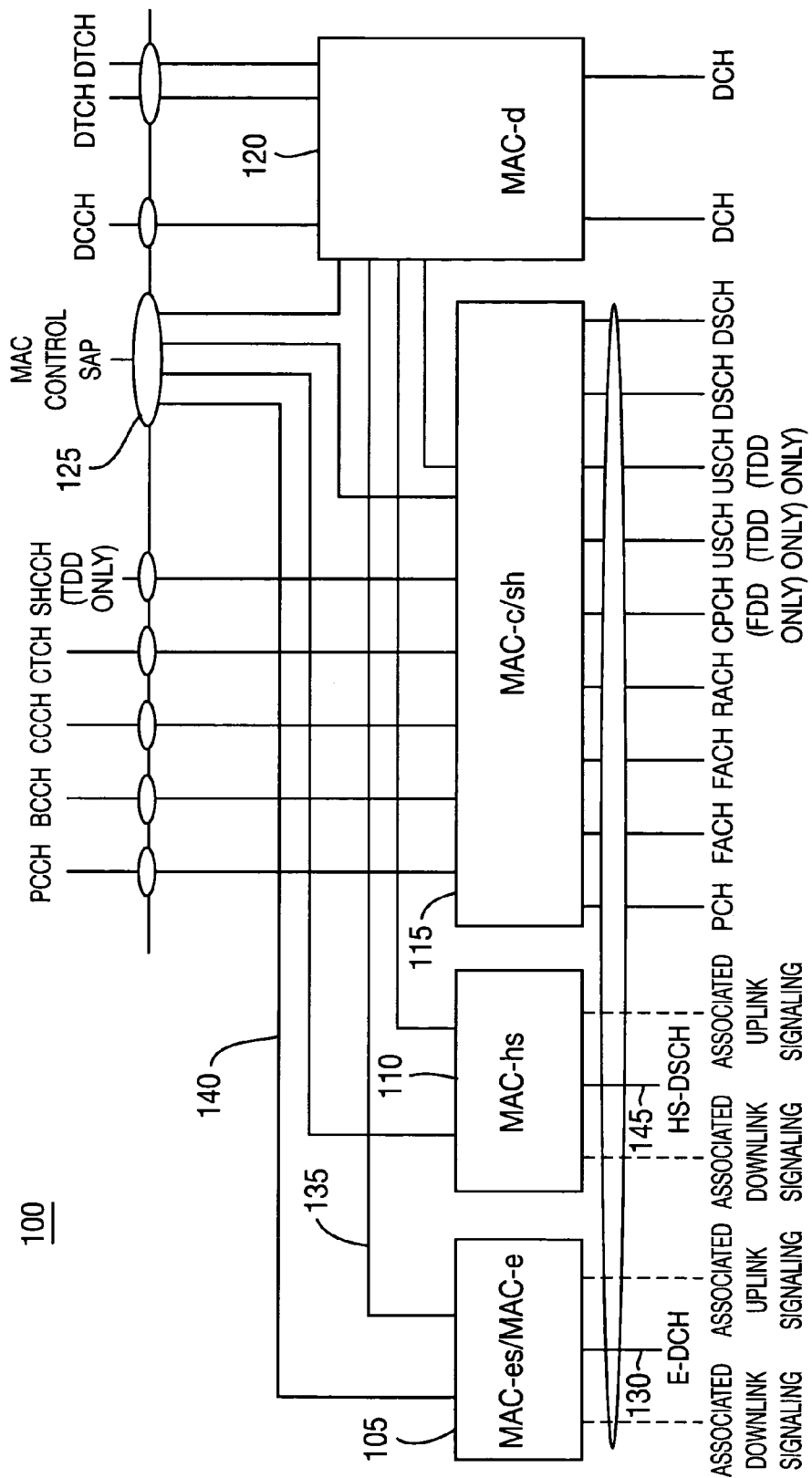
FIG. 1 shows a conventional WTRU side MAC architecture.
Figure 2:
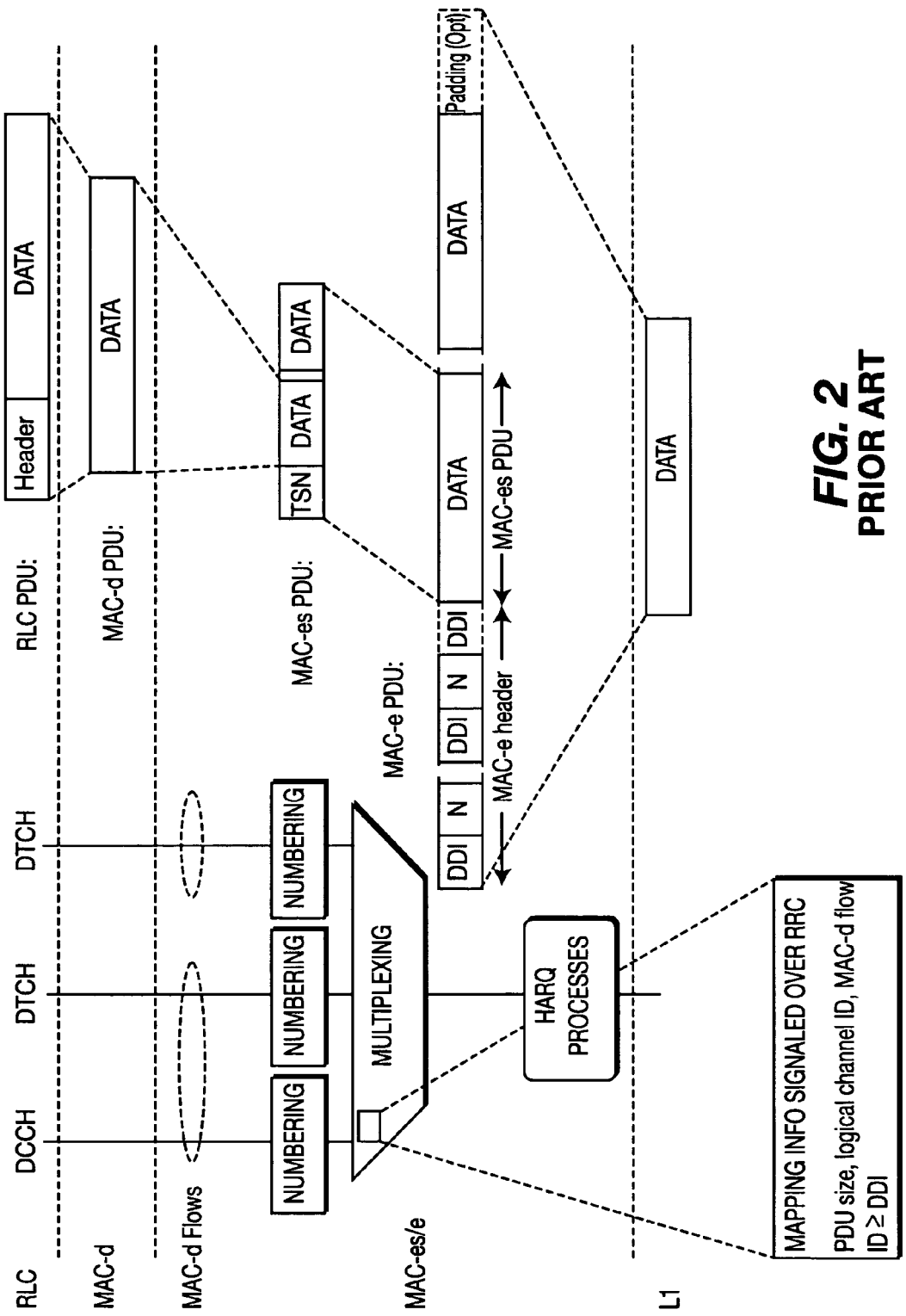
FIG. 2 shows prior art MAC inter-working in the conventional WTRU of FIG. 1.
Figure 3:
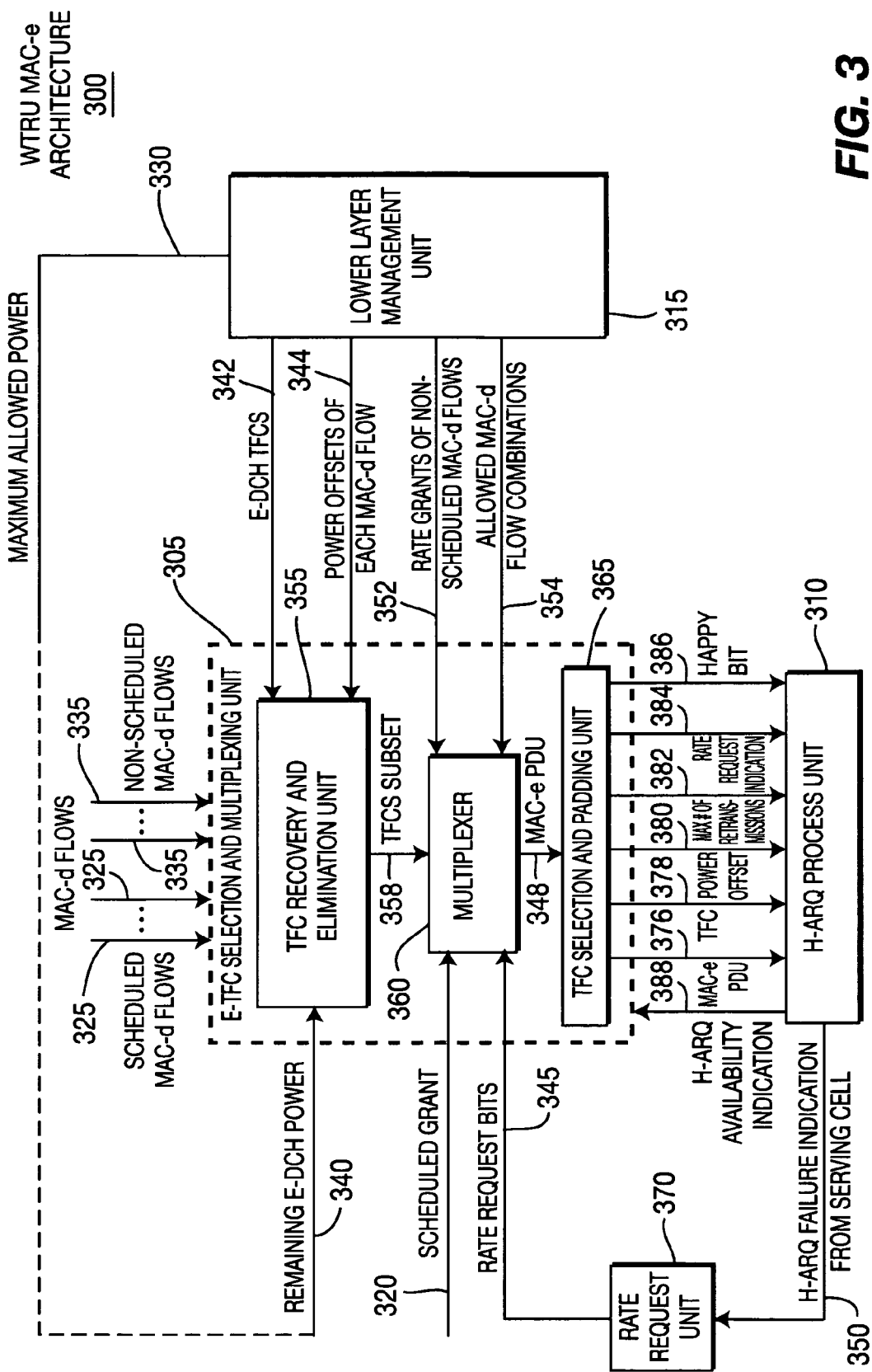
FIG. 3 shows a WTRU MAC-e architecture configured in accordance with the present invention.

FIG. 3 shows a WTRU MAC-e architecture 300 configured in accordance with the present invention. The WTRU MAC-e architecture 300 comprises an E-TFC selection and multiplexing unit 305, an H-ARQ process unit 310 and a lower layer management unit 315.

The E-TFC selection and multiplexing unit 305 receives a scheduled grant signal 320, which indicates the amount of transmit power that can be used by scheduled MAC-d flows 325. The amount of transmit power indicated by the scheduled grant signal 320 can be identified either as a ratio to the DPCCH power or the maximum transmit power 330 provided by the lower layer management unit 315 that can be used for scheduled MAC-d flows 325.

The WTRU sends scheduled MAC-d flows 325 in accordance with a scheduling grant and may also send non-scheduled MAC-d flows 335 at any time up to a configured bit rate.

The E-TFC selection and multiplexing unit 305 comprises a TFC recovery and elimination unit 355, a multiplexer 360 and a TFC selection and padding unit 365. The E-TFC selection and multiplexing unit 305 receives scheduled and non-scheduled MAC-d flows 325, 335 and generates a MAC-e PDU 348 after selecting a TFC for the MAC-e PDU 348. The TFC recovery and elimination unit 355 receives remaining E-DCH power signal 340, based in part on the maximum allowed power 330. The multiplexer 360 receives rate request bits 345 from a rate request unit 370 which is generated based in part on a signal 350 output by the H-ARQ process unit 310 which indicates an H-ARQ failure from a serving cell.

The TFC recovery and elimination unit 355 computes the allowed E-DCH TFCS subset. The TFCS subset is continuously updated by eliminating and recovering TFCs based on the remaining E-DCH power 340, an E-DCH TFCS 342, the power offset of the highest priority MAC-d flow that has E-DCH data to transmit, (based on MAC-d flow power offsets 344), a gain factor for each E-TFC, (inferred from the MAC-d flow power offsets 344), and an E-DCH minimum set rate (included in the E-DCH TFCS 342).

Figure 4:
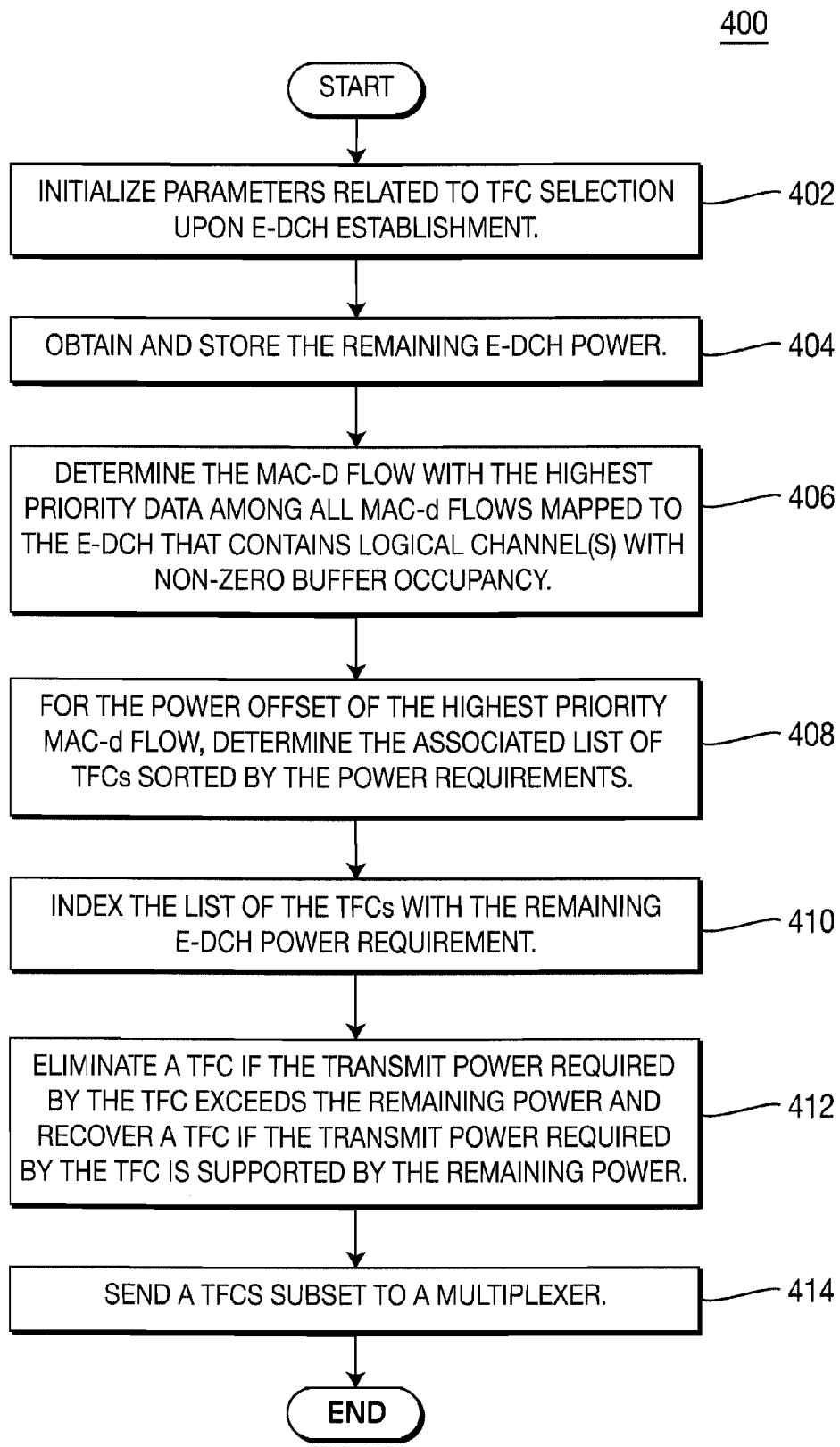
FIG. 4 is a flow diagram of a process for TFC recovery and elimination in accordance with the present invention.

Referring to FIG. 4, a process 400 for TFC recovery and elimination in accordance with the present invention is explained hereinafter. Upon E-DCH establishment, parameters related to TFC selection are initialized (step 402). For each configured MAC-d flow with a unique power offset, a required transmit power of each E-TFC is calculated based on current DPCCH transmit power, the number of bits in each E-TFC and a gain factor of the E-TFC. A list of TFCs sorted by the power requirements is then stored. Each entry in the list identifies the power requirement for the TFC with the power offset for the associated MAC-d flow. Alternatively, one complete list for all MAC-d flows with indices may be stored. RRC signaled parameters, such as the E-DCH transport channel (TrCH) minimum set data rate and other parameters are also set.

For each TTI, the E-TFC recovery and elimination procedure may be initiated. When the E-TFC recovery and elimination procedure is initiated, the TFC recovery and elimination unit 355 receives and stores the remaining E-DCH power 340 (step 404). Based on buffer occupancy and priority of each logical channel and MAC-d flow mapped to the E-DCH, the MAC-d flow with the highest priority data is determined among all MAC-d flows mapped to the E-DCH that contains logical channel(s) with non-zero buffer occupancy (step 406). The power offset of this MAC-d flow is used in subsequent steps.

For the power offset of the highest priority MAC-d flow, the associated list of TFCs sorted by the power requirements is determined (step 408). The list of the TFCs is then indexed with the remaining E-DCH power requirement (step 410). E-TFCs are eliminated if the transmit power required by the E-TFC exceeds the remaining power for the E-DCH ($P_{E-TFC} > P_{remain}$) and recovered if the transmit power required by the E-TFC is supported by the remaining power for the E-DCH (step 412). Preferably a minimum set of E-TFCs is defined such that the E-DCH TFCs within the minimum set are never blocked due to transmit power restriction. The E-TFC recovery and elimination unit 355 outputs a TFCS subset 358 to the multiplexer 360 (step 414).

The multiplexer 360 concatenates multiple MAC-d PDUs into MAC-es PDUs, and to multiplex one or multiple MAC-es PDUs into a single MAC-e PDU 348. The multiplexer 360 also manages and sets the transmission sequence number (TSN) per logical channel for each MAC-es PDU. The multiplexer 360 takes into account the transmit power indicated by the scheduled grant signal 320 for the E-DCH, (i.e., a ratio to DPCCH power), rate grants 352 for non-scheduled MAC-d flows, maximum TFC allowed by the E-DCH remaining power, allowed MAC-d flow combinations 354, relative priority of each logical channel and a header of rate request bits 345, (if the rate request is transmitted in this TTI).

Figure 5B:
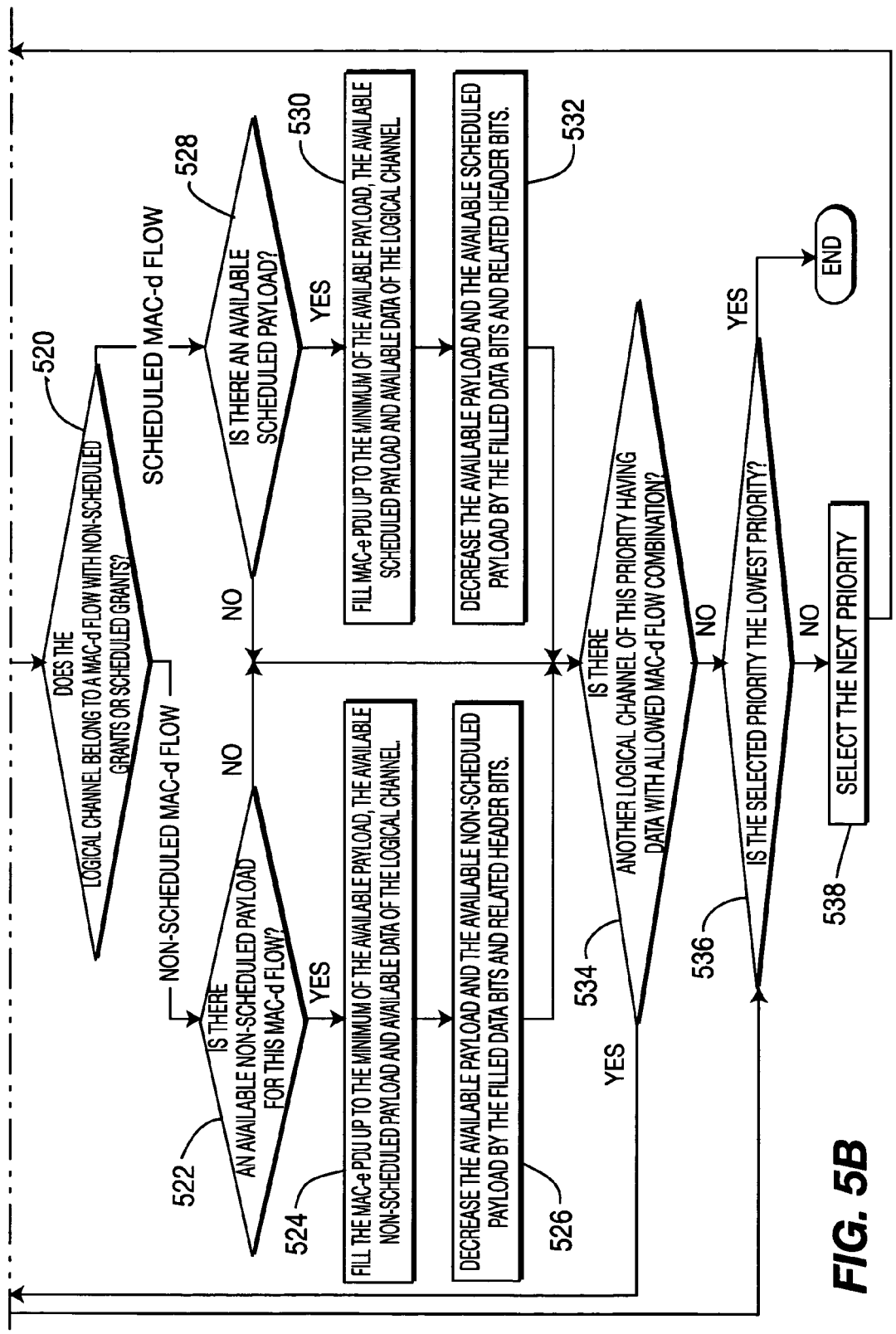

FIGS. 5A and 5B, taken together, depict a flow diagram of a process 500 for multiplexing MAC-d flows into a MAC-e PDU 348 in accordance with the present invention. The multiplexer 360 calculates the maximum supported payload, (i.e., maximum MAC-e PDU size included in the list of supported E-TFCs (TFCS subset)), that can be sent by the WTRU during the upcoming TTI based on the power offset and the remaining power (step 502). Rate request bits are reserved if there is a rate request in the upcoming TTI. The available payload is set to the maximum supported payload (step 504). Based on the transmit power indicated by the scheduled grant signal 320, the multiplexer 360 calculates the maximum scheduled payload that can be transmitted at the selected power offset for this transmission (step 506). The available scheduled payload is set to the maximum scheduled payload (step 508). For each MAC-d flow with a non-scheduled grant, the available non-scheduled payload is set to the value of the non-scheduled grant (step 510).

The following steps are performed for each logical channel in the order of priorities. The highest priority is selected (step 512). It is determined whether there is at least one logical channel having data with the allowed MAC-d flow combination in the selected priority (step 514). If not, the process proceeds to step 536 to determine whether the selected priority is the lowest priority. If it is not the lowest priority, the next priority is selected (step 538) and the process 500 returns back to step 514. If the priority is the lowest, the process ends.

If it is determined at step 514 that there is a logical channel having data, any logical channel is selected randomly if more than one (step 516) and it is further determined whether there is an available payload (step 518). If there is no available payload, the process 500 ends. If there is available payload, it is further determined whether the logical channel belongs to a MAC-d flow with non-scheduled grants or scheduled grants (step 520).

If the logical channel belongs to the MAC-d flow with non-scheduled grants, it is further determined whether there is an available non-scheduled payload for this MAC-d flow (step 522). If so, the MAC-e PDU 348 is filled up to the minimum of the available payload, the available non-scheduled payload and available data of the logical channel (step 524). The available payload and the available non-scheduled payload are decreased by the filled data bits and related header bits accordingly (step 526) and the process 500 proceeds to step 534.

If the logical channel belongs to the MAC-d flow with scheduled grants, it is determined whether there is an available scheduled payload (step 528). If so, the MAC-e PDU 348 is filled up to the minimum of the available payload, the available scheduled payload and available data of the logical channel (step 530). The available payload and the available scheduled payload are decreased by the filled data bits and related header bits accordingly (step 532) and the process 500 proceeds to step 534.

At step 534, it is determined whether there is another logical channel of this priority having data with allowed MAC-d flow combinations. If there is no other logical channel, the process 500 proceeds to step 536 to select a next priority. If there is another logical channel with the same priority, the process 500 returns to step 516.

The TFC selection and padding unit 365 selects an appropriate E-TFC and applies padding for the MAC-e PDU 348 to fit the selected E-TFC. The TFC selection and padding unit 365 determines the MAC-e PDU size and selects the smallest TFC out of the list of supported TFCs for this power offset, which is larger than the MAC-e PDU size after multiplexing. The TFC selection and padding unit 365 then adds padding to the MAC-e PDU 348 to fit the selected TFC. The E-TFC selection and multiplexing unit 305 outputs a MAC-e PDU 376, a TFC 378, power offset 380, the maximum number of retransmissions 382, a rate request indication 384 and a happy bit 386 to the H-ARQ process unit 310.

The H-ARQ process unit 310 is responsible for managing each H-ARQ process. The H-ARQ process unit 310 provides synchronous operation for transmissions and retransmission, H-ARQ feedback processing on H-ARQ information channel (HICH), (i.e., ACK/NACK), and tracking the maximum number of retransmissions per H-ARQ process. The H-ARQ process unit 310 may output a signal 350 when an H-ARQ failure from a serving cell occurs. When an H-ARQ process is available, an H-ARQ process availability indication 388 is sent to the E-TFC selection and multiplexing unit 305.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of controlling transmissions of data via an enhanced dedicated channel (E-DCH), the method comprising:
    generating by a wireless transmit/receive unit (WTRU), a list of available transport format combinations (TFCs) based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;
    storing the list of available TFCs;
    selecting a TFC from the list of available TFCs based on the power offset;
    generating an enhanced uplink medium access control (MAC-e) protocol data unit (PDU) using the selected TFC; and
    forwarding the MAC-e PDU to a hybrid-automatic repeat request (H-ARQ) process for transmission.

2. The method of claim 1, wherein the list of available TFCs is updated by:
    determining a highest priority logical channel having data for E-DCH transmission;
    determining a MAC-d flow to which the highest priority logical channel is mapped;
    determining a list of TFCs associated to the MAC-d flow to which the highest priority logical channel is mapped;
    indexing the list of TFCs with the remaining E-DCH power; and
    updating the list of TFCs by eliminating TFCs which exceed the remaining E-DCH power and by recovering TFCs supported by the remaining E-DCH power.

3. The method of claim 2, wherein a minimum set of TFCs is defined such that the TFCs within the minimum set are never blocked due to transmit power restriction.

4. The method of claim 1, wherein multiple MAC-d flows are multiplexed into a single MAC-e PDU.

5. The method of claim 1, wherein the MAC-e PDU is generated by considering at least one of a scheduled grant, rate grants of non-scheduled MAC-d flows, maximum TFC allowed by remaining E-DCH power, allowed MAC-d flow combinations, relative priority of each logical channel and a header of a rate request bit.

6. The method of claim 5, wherein a smallest TFC is selected out of the list of available TFCs, which is larger than a size of the MAC-e PDU, and padding is applied to the MAC-e PDU to fit the selected TFC.

7. The method of claim 1 further comprising:
    establishing the E-DCH;
    initiating parameters related to the TFC selection; and
    obtaining and storing the remaining E-DCH power.

8. The method of claim 1 further comprising:
    calculating a maximum supported payload based on a power offset and a remaining E-DCH power;
    setting an available payload to the maximum supported payload; and
    calculating a maximum scheduled payload that can be transmitted at a selected power offset for transmission.

9. The method of claim 8 further comprising:
    setting an available non-scheduled payload to a value of a non-scheduled grant for each MAC-d flow with a non-scheduled grant; and
    on a condition that there is at least one logical channel having data with an allowed MAC-d flow combination, and there is the available payload, determining whether the logical channel belongs to a MAC-d flow with non-scheduled grants or scheduled grants.

10. The method of claim 9, wherein on a condition that the logical channel belongs to a MAC-d flow with non-scheduled grants, the MAC-e PDU is filled up to a minimum of the available payload, the available non-scheduled payload and available data of the logical channel.

11. The method of claim 10 further comprising:
    decreasing the available payload and the available non-scheduled payload by filled data bits and related header bits.

12. The method of claim 9 wherein on a condition that the logical channel belongs to a MAC-d flow with scheduled grants, the MAC-e PDU is filled up to a minimum of the available payload, the available scheduled payload and available data of the logical channel.

13. The method of claim 12 further comprising:
    decreasing the available payload and the available scheduled payload by filled data bits and related header bits.

14. The method of claim 1 further comprising:
    selecting an appropriate E-DCH TFC;
    determining the MAC-e PDU size;
    selecting the smallest TFC out of a list of supported TFCs for a particular power offset, which is larger than the MAC-e PDU size after multiplexing; and
    adding padding to the MAC-e PDU to fit the selected appropriate E-DCH TFC.

15. A wireless transmit/receive unit (WTRU) for controlling transmissions of data via an enhanced dedicated channel (E-DCH), the WTRU comprising:
    an enhanced uplink transport format combination (E-TFC) selection and multiplexing unit comprising:
        a transport format combination (TFC) recovery and elimination unit for generating a list of available TFCs based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;
a multiplexer for generating an enhanced uplink medium access control (MAC-e) protocol data unit (PDU); and
a TFC selection and padding unit for selecting a TFC, based on the power offset, for the MAC-e PDU and applying padding to the MAC-e PDU to fit the selected TFC;
a hybrid-automatic repeat request (H-ARQ) process unit for transmitting the MAC-e PDU; and
a lower layer management unit in communication with the TFC recovery and elimination unit and the multiplexer, wherein the lower layer management unit sends a signal to the TFC recovery and elimination unit indicating power offsets of each of the MAC-d flows.

16. The WTRU of claim 15 further comprising:
a rate request unit for generating rate request bits used by the multiplexer to generate the MAC-e PDU.

17. The WTRU of claim 15 wherein a minimum set of TFCs is defined such that the TFCs within the minimum set are never blocked due to transmit power restriction.

18. The WTRU of claim 15 wherein the multiplexer multiplexes multiple MAC-d flows into a single MAC-e PDU.

19. The WTRU of claim 15 wherein the MAC-e PDU is generated by the multiplexer considering at least one of a scheduled grant, rate grants of non-scheduled MAC-d flows, maximum TFC allowed by remaining E-DCH power, allowed MAC-d flow combinations, relative priority of each logical channel and a header of a rate request bit.

20. The WTRU of claim 19 wherein a smallest TFC is selected out of the list of available TFCs, which is larger than a size of the MAC-e PDU, and padding is applied by the TFC selection and padding unit to the MAC-e PDU to fit the selected smallest TFC.

21. A wireless transmit/receive unit (WTRU) for controlling transmissions of data via an enhanced dedicated channel (E-DCH), the WTRU comprising:
an enhanced uplink transport format combination (E-TFC) selection and multiplexing unit comprising:
a transport format combination (TFC) recovery and elimination unit for generating a list of available TFCs based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;
a multiplexer for generating an enhanced uplink medium access control (MAC-e) protocol data unit (PDU); and
a TFC selection and padding unit for selecting a TFC, based on the power offset, for the MAC-e PDU and applying padding to the MAC-e PDU to fit the selected TFC;
a hybrid-automatic repeat request (H-ARQ) process unit for transmitting the MAC-e PDU; and
a lower layer management unit in communication with the TFC recovery and elimination unit and the multiplexer, wherein the lower layer management unit sends a signal to the TFC recovery and elimination unit indicating an E-DCH transport format combination set (TFCS).

22. A wireless transmit/receive unit (WTRU) for controlling transmissions of data via an enhanced dedicated channel (E-DCH), the WTRU comprising:
an enhanced uplink transport format combination (E-TFC) selection and multiplexing unit comprising:
a transport format combination (TFC) recovery and elimination unit for generating a list of available TFCs based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;
a multiplexer for generating an enhanced uplink medium access control (MAC-e) protocol data unit (PDU); and
a TFC selection and padding unit for selecting a TFC, based on the power offset, for the MAC-e PDU and applying padding to the MAC-e PDU to fit the selected TFC;
a hybrid-automatic repeat request (H-ARQ) process unit for transmitting the MAC-e PDU; and
a lower layer management unit in communication with the TFC recovery and elimination unit and the multiplexer, wherein the lower layer management unit sends a signals to the multiplexer indicating rate grants of non-scheduled MAC-d flows.

23. A wireless transmit/receive unit (WTRU) for controlling transmissions of data via an enhanced dedicated channel (E-DCH), the WTRU comprising:
an enhanced uplink transport format combination (E-TFC) selection and multiplexing unit comprising:
a transport format combination (TFC) recovery and elimination unit for generating a list of available TFCs based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;
a multiplexer for generating an enhanced uplink medium access control (MAC-e) protocol data unit (PDU); and
a TFC selection and padding unit for selecting a TFC, based on the power offset, for the MAC-e PDU and applying padding to the MAC-e PDU to fit the selected TFC;
a hybrid-automatic repeat request (H-ARQ) process unit for transmitting the MAC-e PDU; and
a lower layer management unit in communication with the TFC recovery and elimination unit and the multiplexer, wherein the lower layer management unit sends a signal to the multiplexer indicating allowed MAC-d flow combinations.

24. A wireless transmit/receive unit (WTRU) for controlling transmissions of data via an enhanced dedicated channel (E-DCH), the WTRU comprising:
an enhanced uplink transport format combination (E-TFC) selection and multiplexing unit comprising:
a transport format combination (TFC) recovery and elimination unit for generating a list of available TFCs based on a plurality of dedicated channel medium access control (MAC-d) flows, wherein the list of available TFCs is continuously updated by eliminating and recovering TFCs based on remaining E-DCH power, an E-DCH transport format combination set (TFCS), a power offset of a highest priority MAC-d flow that has E-DCH data to transmit, and a gain factor for each TFC;

a multiplexer for generating an enhanced uplink medium access control (MAC-e) protocol data unit (PDU); and a TFC selection and padding unit for selecting a TFC, based on the power offset, for the MAC-e PDU and applying padding to the MAC-e PDU to fit the selected TFC;

a hybrid-automatic repeat request (H-ARQ) process unit for transmitting the MAC-e PDU; and a lower layer management unit in communication with the TFC recovery and elimination unit and the multiplexer, wherein the lower layer management unit generates a first signal indicating maximum allowed power, wherein the first signal is used to generate a second signal input to the TFC recovery and elimination unit indicating a remaining E-DCH power which is used to continuously update the list of TFCs by eliminating and recovering TFCs.

* * * * *